United States Patent
Dowling et al.

(10) Patent No.: US 12,276,844 B2
(45) Date of Patent: Apr. 15, 2025

(54) DISTRIBUTED TAP ARCHITECTURE INCORPORATING HARDENED CONNECTIVITY

(71) Applicant: COMMSCOPE TECHNOLOGIES LLC, Hickory, NC (US)

(72) Inventors: Douglas Ferris Dowling, Cary, NC (US); Erik J. Gronvall, Bloomington, MN (US); Frederic Amt, Doylestown, PA (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 18/410,705

(22) Filed: Jan. 11, 2024

(65) Prior Publication Data

US 2024/0264384 A1 Aug. 8, 2024

Related U.S. Application Data

(63) Continuation of application No. 17/459,682, filed on Aug. 27, 2021, now abandoned, which is a
(Continued)

(51) Int. Cl.
*G02B 6/38* (2006.01)
*G02B 6/44* (2006.01)
*H02G 15/013* (2006.01)

(52) U.S. Cl.
CPC ......... *G02B 6/3825* (2013.01); *G02B 6/3897* (2013.01); *G02B 6/4444* (2013.01); *G02B 6/4454* (2013.01); *H02G 15/013* (2013.01)

(58) Field of Classification Search
CPC .................................................. G02B 6/3825
See application file for complete search history.

(56) References Cited

U.S. PATENT DOCUMENTS 5,317,663 A   5/1994   Beard et al.
6,547,450 B2 *   4/2003   Lampert .............. G02B 6/3849
                                                        385/139

(Continued)

FOREIGN PATENT DOCUMENTS

WO   2013117598 A2   8/2013
WO   2014005916 A2   1/2014
(Continued)

OTHER PUBLICATIONS

International Search Report and Written Opinion of the International Searching Authority for International Patent Application No. PCT/US2018/037109 mailed Oct. 8, 2018, 13 pages.
(Continued)

*Primary Examiner* — Chad H Smith
(74) *Attorney, Agent, or Firm* — Merchant & Gould P.C.

(57) ABSTRACT

Distributed optical tapping architectures include two or more optical tap terminals daisy-chained together. Each optical tap terminal includes an environmentally sealed enclosure; an optical tapping circuit positioned within an interior of the enclosure, the optical tapping circuit including an tap input, a tap pass-through output, and a tap drop output; and hardened interface locations (e.g., de-mateable fiber optic connection locations, cable-pass through glands, etc.) corresponding to the tap input, the tap pass-through output and the tap drop output.

18 Claims, 12 Drawing Sheets

Related U.S. Application Data continuation of application No. 16/621,361, filed as application No. PCT/US2018/037109 on Jun. 12, 2018, now abandoned.

(60) Provisional application No. 62/563,741, filed on Sep. 27, 2017, provisional application No. 62/518,482, filed on Jun. 12, 2017.

(56) References Cited

U.S. PATENT DOCUMENTS

| | | | |
|---|---|---|---|
| 6,579,014 | B2 | 6/2003 | Melton et al. |
| 6,648,520 | B2 | 11/2003 | Mcdonald et al. |
| 6,678,442 | B2 | 1/2004 | Gall et al. |
| 7,090,407 | B2 | 8/2006 | Melton et al. |
| 7,137,742 | B2 | 11/2006 | Theuerkorn et al. |
| 7,207,727 | B2 | 4/2007 | Tran et al. |
| 7,266,265 | B2 | 9/2007 | Gall et al. |
| 7,444,056 | B2 | 10/2008 | Allen et al. |
| 7,572,065 | B2 | 1/2009 | Lu et al. |
| 7,686,519 | B2 | 3/2010 | Lu |
| 7,744,286 | B2 | 6/2010 | Lu et al. |
| 7,744,386 | B1 | 6/2010 | Speidel et al. |
| RE43,762 | E | 10/2012 | Smith et al. |
| 8,363,999 | B2 | 1/2013 | Mertesdorf et al. |
| 9,304,262 | B2 | 4/2016 | Lu |
| 9,557,498 | B2 | 1/2017 | Loeffelholz |
| 9,739,945 | B2 | 8/2017 | Dowling |
| 10,281,660 | B2 | 5/2019 | Loeffelholz |
| 2002/0181925 | A1 | 12/2002 | Hodge et al. |
| 2006/0093303 | A1* | 5/2006 | Reagan ............... G02B 6/4442 385/76 |
| 2006/0245687 | A1 | 11/2006 | Gall et al. |
| 2008/0069511 | A1 | 3/2008 | Blackwell et al. |
| 2008/0285933 | A1* | 11/2008 | Vogel ............... G02B 6/44528 385/135 |
| 2011/0026928 | A1 | 2/2011 | Stango et al. |
| 2014/0041893 | A1 | 2/2014 | Adams et al. |
| 2016/0041356 | A1 | 2/2016 | Wang et al. |
| 2016/0124173 | A1 | 5/2016 | Kowalczyk et al. |
| 2016/0154184 | A1 | 6/2016 | Bund et al. |

FOREIGN PATENT DOCUMENTS

| | | | |
|---|---|---|---|
| WO | 2014167447 A1 | 10/2014 | |
| WO | 2014197894 A1 | 12/2014 | |
| WO | 2015150204 A1 | 10/2015 | |
| WO | WO-2015150204 A2 * | 10/2015 | ........... G02B 6/3897 |
| WO | 2016043922 A1 | 3/2016 | |
| WO | 2016205340 A1 | 12/2016 | |
| WO | 2017046190 A2 | 3/2017 | |
| WO | 2018020022 A1 | 2/2018 | |

OTHER PUBLICATIONS

Extended European Search Report for European Patent Application No. 18818735.5 mailed Feb. 3, 2021, 8 pages.

"Mini-OTE 300 Tap", Installation Instructions, CommScope, 10 pages (Apr. 2017).

"Splitter Tray or Splitter Module optical taps for FTTH network deployments leveraging a tapped trunk architecture", Charles Optical Taps, 2 pages (Admitted Prior Art as of Jun. 12, 2017).

"FTTH Solutions with Rural Taps", CommScope, 9 pages (Feb. 2020).

* cited by examiner

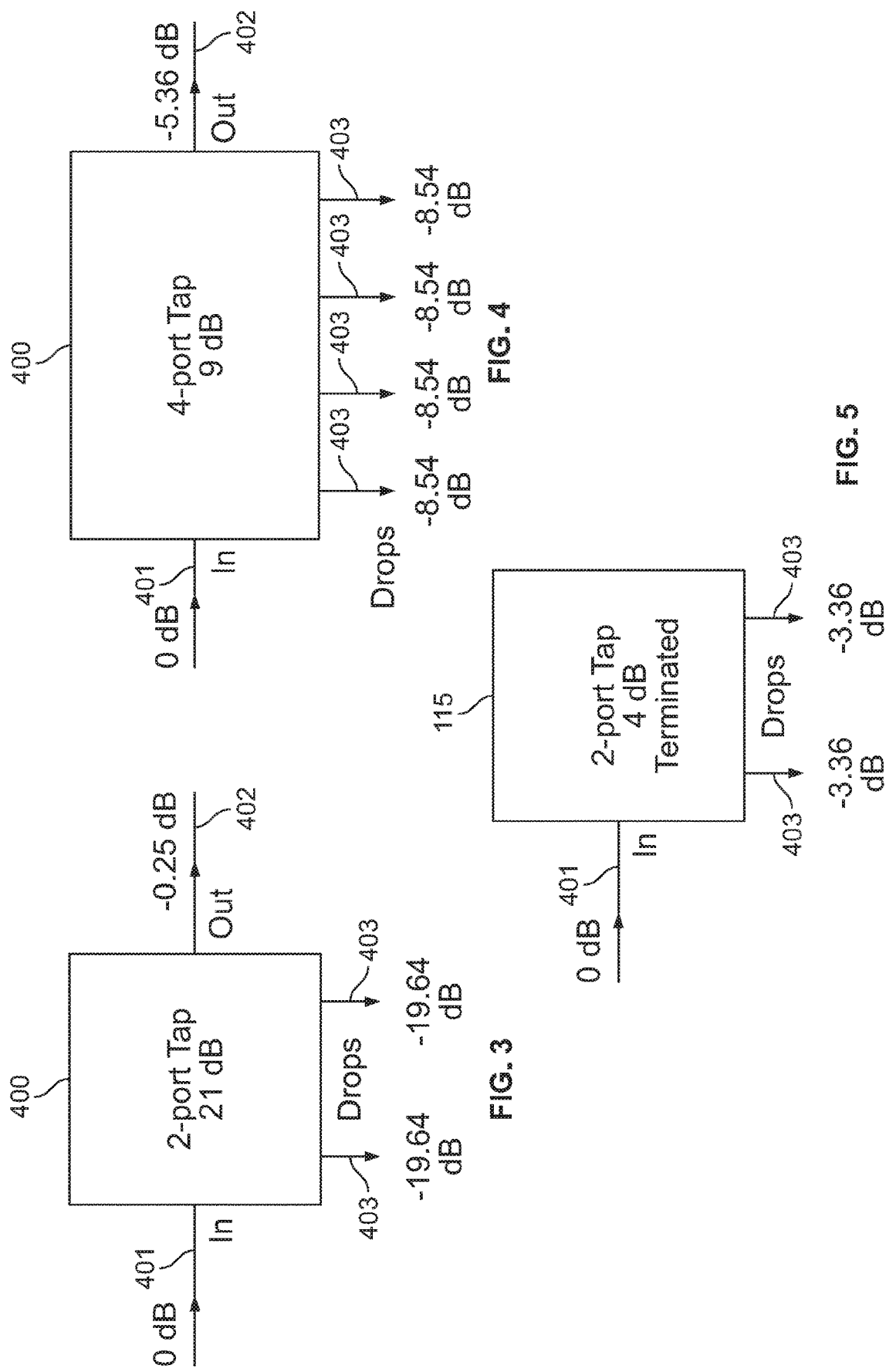

150

| Tap Value | Insertion Loss (dB)* | | Drop Loss (dB)** | |
|---|---|---|---|---|
| | Typical | Max | Typical | Max |
| 2-Port Taps | | | | |
| 21 dB | 0.25 | 0.40 | 19.64 | 21.70 |
| 19 dB | 0.35 | 0.50 | 16.62 | 18.20 |
| 17 dB | 0.40 | 0.60 | 15.69 | 17.30 |
| 15 dB | 0.60 | 0.80 | 13..66 | 15.00 |
| 14 dB | 0.80 | 1.00 | 11.93 | 13.00 |
| 12 dB | 1.06 | 1.30 | 10.60 | 11.60 |
| 10 dB | 1.69 | 2.00 | 8.88 | 9.80 |
| 8 dB | 2.32 | 2.70 | 7.65 | 8.50 |
| 7 dB | 3.58 | 4.10 | 6.23 | 7.00 |
| 5 dB | 5.36 | 6.00 | 5.18 | 5.80 |
| 4 dB Terminating | n/a | n/a | 3.36 | 3.70 |
| 4-Port Taps | | | | |
| 21 dB | 0.40 | 0.60 | 19.06 | 20.70 |
| 19 dB | 0.60 | 0.80 | 17.02 | 18.40 |
| 17 dB | 0.80 | 1.00 | 15.29 | 16.40 |
| 15 dB | 1.06 | 1.30 | 13.69 | 15.00 |
| 13 dB | 1.69 | 2.00 | 12.24 | 13.20 |
| 11 dB | 2.32 | 2.70 | 11.01 | 11.90 |
| 10 dB | 3.58 | 4.10 | 9.59 | 10.40 |
| 9 dB | 5.36 | 6.00 | 8.54 | 9.20 |
| 7 dB Terminating | n/a | n/a | 6.72 | 7.10 |
| 8-Port Taps | | | | |
| 21 dB | 0.80 | 1.00 | 18.49 | 19.70 |
| 19 dB | 1.06 | 1.30 | 17.16 | 18.30 |
| 17 dB | 1.69 | 2.00 | 15.43 | 16.50 |
| 15 dB | 2.32 | 2.70 | 14.20 | 15.20 |
| 14 dB | 3.58 | 4.10 | 12.78 | 13.70 |
| 12 dB | 5.36 | 6.00 | 11.71 | 12.50 |
| 11 dB Terminating | n/a | n/a | 9.88 | 10.40 |

FIG. 6

DISTRIBUTED TAP ARCHITECTURE INCORPORATING HARDENED CONNECTIVITY

CROSS-REFERENCE TO RELATED APPLICATIONS

This application is a continuation of U.S. patent application Ser. No. 17/459,682, filed Aug. 27, 2021 which is a continuation of U.S. patent application Ser. No. 16/621,361, filed on Dec. 11, 2019, which is a National Stage Application of PCT/US2018/037109, filed on Jun. 12, 2018, which and claims the benefit of U.S. Patent Application Ser. No. 62/518,482, filed on Jun. 12, 2017, and claims the benefit of U.S. Patent Application Ser. No. 62/563,741, filed on Sep. 27, 2017, the disclosures of which are incorporated herein by reference in their entireties. To the extent appropriate, a claim of priority is made to each of the above disclosed applications.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability. One example of a passive optical network includes a distributed split architecture. Another example of a passive optical network includes a distributed tap architecture.

There is a need to incorporate hardened technology into distributed tap architectures.

SUMMARY

Aspects of the present disclosure relate to distributed tap architectures incorporating hardened connectivity. Examples of non-hardened tap architectures are disclosed in U.S. Pat. Nos. 6,678,442 and 7,266,265, the disclosures of which are hereby incorporated herein by reference.

In accordance with some aspects of the disclosure, an optical tap terminal includes an environmentally sealed enclosure and an optical tapping circuit positioned within the interior of the enclosure. The enclosure is sealed for use in an outdoor environment and defines an interior. The optical tapping circuit includes a tap input, a tap pass-through output, and a tap drop output. Hardened de-mateable fiber optic connection locations correspond to the tap input, the tap pass-through output and the tap drop output.

In certain implementations, the hardened de-mateable fiber optic connection locations include hardened adapter ports provided at a wall of the enclosure.

In certain implementations, the enclosure is re-enterable.

In certain implementations, the enclosure defines gel-sealed cable ports for allowing drop cables and/or pass-through cables to be routed into the enclosure.

In certain implementations, the enclosure is seal-rated for underground applications.

In certain implementations, the enclosure includes brackets, tabs or other structures for permitting pole mounting, strand mounting or hand-hole mounting.

In certain implementations, one or more splice trays are positioned within the interior of the enclosure.

In certain implementations, a passive optical power splitter or a wavelength division multiplexer is positioned within the interior of the enclosure.

In certain implementations, additional hardened de-mateable fiber optic connection locations are carried with the enclosure, the additional hardened de-mateable fiber optic connection locations are not optically connected to the optical tapping circuit.

In certain examples, the additional hardened de-mateable fiber optic connection locations include hardened adapter ports provided at a wall of the enclosure.

In certain implementations, the optical tap terminal includes only one tap drop output.

In certain implementations, the optical tap terminal includes 2, 3, 4, 5, 6, 7, 8 or more tap drop outputs.

In certain implementations, at least one of the hardened de-mateable fiber optic connection locations is provided as a hardened connector at a free end of a fiber optic cable tether having a base end coupled to the enclosure.

In accordance with some aspects of the disclosure, a fiber distribution architecture includes a plurality of the optical tap terminals of claim 1 daisy chained together along one fiber line with the tap input of a downstream one of the optical tap terminals coupled to the tap pass-through output of an immediately upstream one of the optical tap terminals.

In accordance with some aspects of the disclosure, an optical tap terminal includes an environmentally sealed enclosure; an optical tapping circuit positioned within the interior of the enclosure; and a gel sealant unit that mounts within the enclosure. The enclosure is sealed for use in an outdoor environment and defines an interior. The optical tapping circuit includes an tap input, a tap pass-through output, and a tap drop output. The gel sealant unit defines cable ports for sealing fiber optic cables optically coupled to the tap input, the tap pass-through output, and the tap drop output. The gel sealing unit includes a volume of gel defining the cable ports. The volume of gel is positioned between first and second pressurization structures. The gel sealant unit also includes an actuator for forcing the first and second pressurization structures together to pressurize the volume of gel. The actuator includes at least one spring for applying spring load to the volume of gel to maintain the gel under spring pressure.

In certain implementations, the enclosure includes a base and a removable dome, and wherein the volume of gel mounts and seals within the base.

In certain implementations, the optical tapping circuit includes only one tap drop output.

In accordance with some aspects of the disclosure, a fiber distribution architecture includes a tap terminal including an environmentally sealed enclosure sealed for use in an outdoor environment, the enclosure defining an interior; an optical tapping circuit positioned within the interior of the enclosure; and a fiber distribution device positioned outside the enclosure of the tap terminal. The optical tapping circuit includes an tap input, a tap pass-through output, and a tap drop output. The fiber distribution device includes a passive optical power splitter having an input optically coupled to the tap drop output. The fiber distribution device also includes hardened de-mateable fiber optic connection locations optically couple to outputs of the passive optical power splitter.

In certain implementations, the a plurality of the optical tap terminals are daisy chained together along one fiber line with the tap input of a downstream one of the optical tap terminals coupled to the tap pass-through output of an immediately upstream one of the optical tap terminals.

In certain implementations, the optical tapping circuits each include only one tap drop output.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 is a schematic diagram illustrating a first example tap terminal having an input, a pass-through output, and two drop ports;

FIG. 4 is a schematic diagram illustrating a second example tap terminal having an input, a pass-through output, and four drop ports;

FIG. 5 is a schematic diagram illustrating a terminal having an input, no pass-through output, and two drop ports;

FIG. 6 is a table of tap values that can be used to assist in planning optical link budgets for a daisy chain of taps, the table specifies optical insertion loss from the input distribution fiber to the output fiber (e.g., to the next tap);

DETAILED DESCRIPTION

Aspects of the present disclosure relate to fiber to the home deployments applicable for regions with low to medium subscriber density (e.g., rural localities). In certain examples, aspects of the present disclosure relate to the use of a distributed tap architecture to assist in reducing cost, improving business opportunities and securing project funding. In certain examples, the distributed tap architecture incorporates hardened connectivity to enhance ease of installation and to allow deployments to withstand outdoor environmental conditions.

Aspects of the present disclosure related to a fiber optic network topology (e.g., fiber-to-the-home, fiber-to-the-node, fiber-to-the-distribution point, fiber-to-the-curb, etc.) that utilizes a distributed tap architecture. A typical distributed tap architecture uses fiber optic taps arranged with a linear, daisy-chain topology. In such a distributed tap architecture, an optical signal passes through the tap and continues down the fiber, while the tap syphons (e.g., drops off) a portion of the signal for locally connected subscribers. Multiple taps can be placed consecutively down the line until the optical link budget is exhausted or the maximum number of subscribers per optical line terminal port (typically 32-64 or more subscribers are supported) has been reached. Tap terminals can be daisy-chained together to form the distributed tap architecture. The tap terminals may have different tap port counts such as one-port, two-port, three-port, four-port, five-port, six-port, seven-port, eight-port or more. For each terminal different tap values (e.g., ranging from minus 0 dB to minus 21 dB) are available depending on how much optical power should be dropped off at each location. The tap value represents the loss between the input (distribution fiber) and the drop ports. The remaining optical power passes through the tap to the output distribution fiber, towards the next tap. The closer the tap is to the optical line terminal, the less power (proportionately) should be dropped off. In certain examples, tap drop ports, tap input ports and tap pass-through output ports at the tap terminals can include hardened de-mateable connection locations that facilitate a simple connect and disconnect of the customer drop cable. In certain examples, tables of tap values can be used to assist in planning optical link budgets for a daisy chain of taps (e.g., see example table 150 of FIG. 6). In the tables, insertion loss specifies optical loss from the input distribution fiber to the output fiber (e.g., to the next tap). The final tap in the chain has no output fiber and hence is "terminating." The drop loss specifies optical loss from the input distribution fiber to the drop ports. All drop ports of a given tap have the same loss. The "tap value" corresponds to the drop loss (max).

Figure 1:
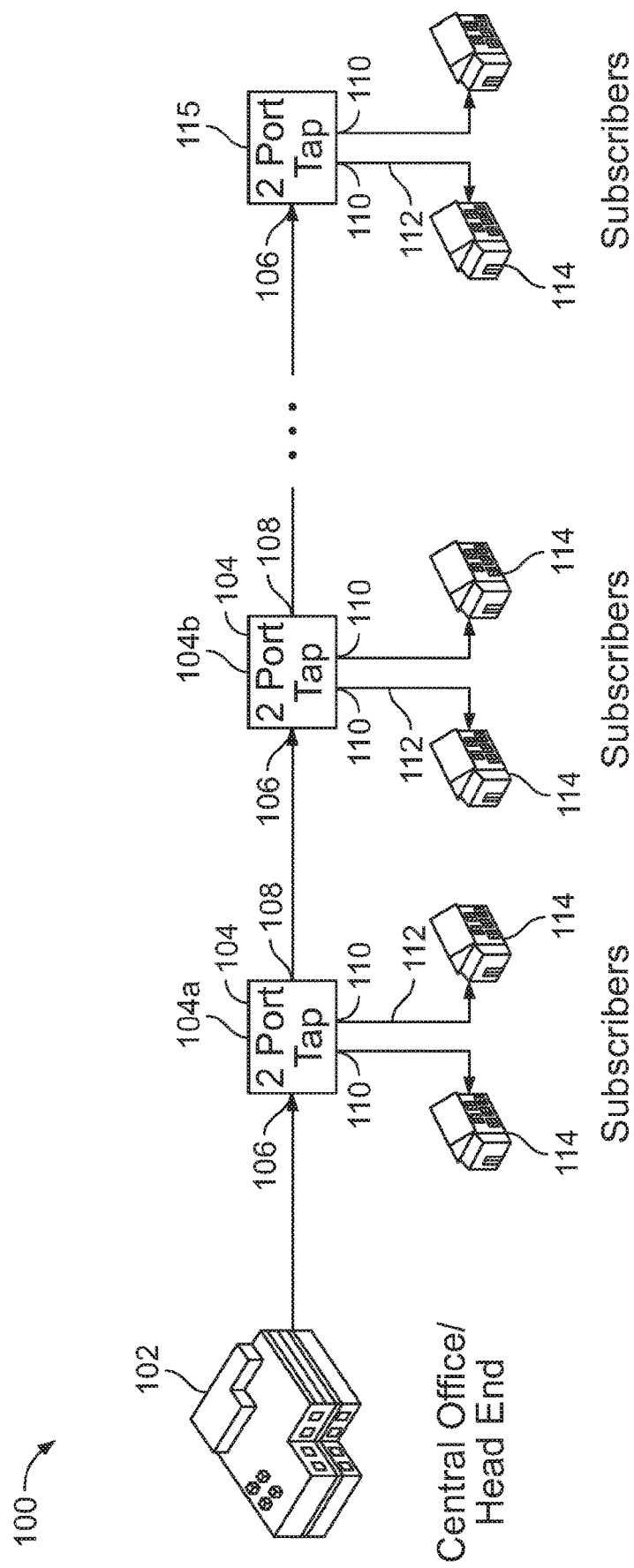
FIG. 1 is a schematic diagram illustrating an example distributed tap architecture in accordance with the principles of the present disclosure.

FIG. 1 shows an example distributed tap architecture 100 in accordance with the principles of the present disclosure. The distributed tap architecture 100 can extend from a central office/head end 102, which may include a plurality of optical line terminal ports. The distributed tap architecture 100 includes a plurality of tap terminals 104a, 104b that are daisy-chained together. Tap terminals 104a, 104b each include an optical tap input 106, an optical tap pass-through output 108 and a plurality of optical tap drop outputs 110. It will be appreciated that the tap input 106, the tap pass-through output 108 and the tap drop outputs 110 can each incorporate hardened connectivity. For example, for each optical input or output, a hardened de-mateable fiber optic connection location can be provided.

Drop cables 112 can be routed from the tap drop outputs 110 to subscriber locations 114. The drop cables 112 can be routed directly to subscriber locations, or can be routed to intermediate multi-service terminals (e.g., drop terminals) having a plurality of hardened de-mateable fiber optic connection locations. In certain examples, rather than using multiple drop cables 112, a multi-fiber cable can be used to optically coupled the tap drop outputs to a multi-service terminal having a plurality of de-mateable fiber optic connection locations. Individual drop cables can then be routed from the multi-service terminal to the subscriber locations. The drop cables can include patch cords having hardened fiber optic connectors at each end.

In certain examples, hardened de-mateable fiber optic connection locations can be provided directly at the tap terminals 104a, b or alternatively at the ends of tethers or stubs that extend from the tap terminals 104a, b. The tethers or stubs can be relatively short in length, or can be relatively long so as to extend to another tap terminal, or to a subscriber location.

The final terminal in the distributed tap architecture 100 can include a terminal 115 that does not have a tap pass-through output 108. While the terminals 104 are shown each having two tap drop outputs 110, it will be appreciated that other numbers of drop outputs (e.g., three, four, five, six, seven, eight or other numbers) can also be used. Moreover, in a given distributed tap architecture 100, the number of drops provided at each terminal need not be the same. Instead, a different number of drop locations can be provided at each tap to assist in matching potential subscriber demand.

Figure 2:
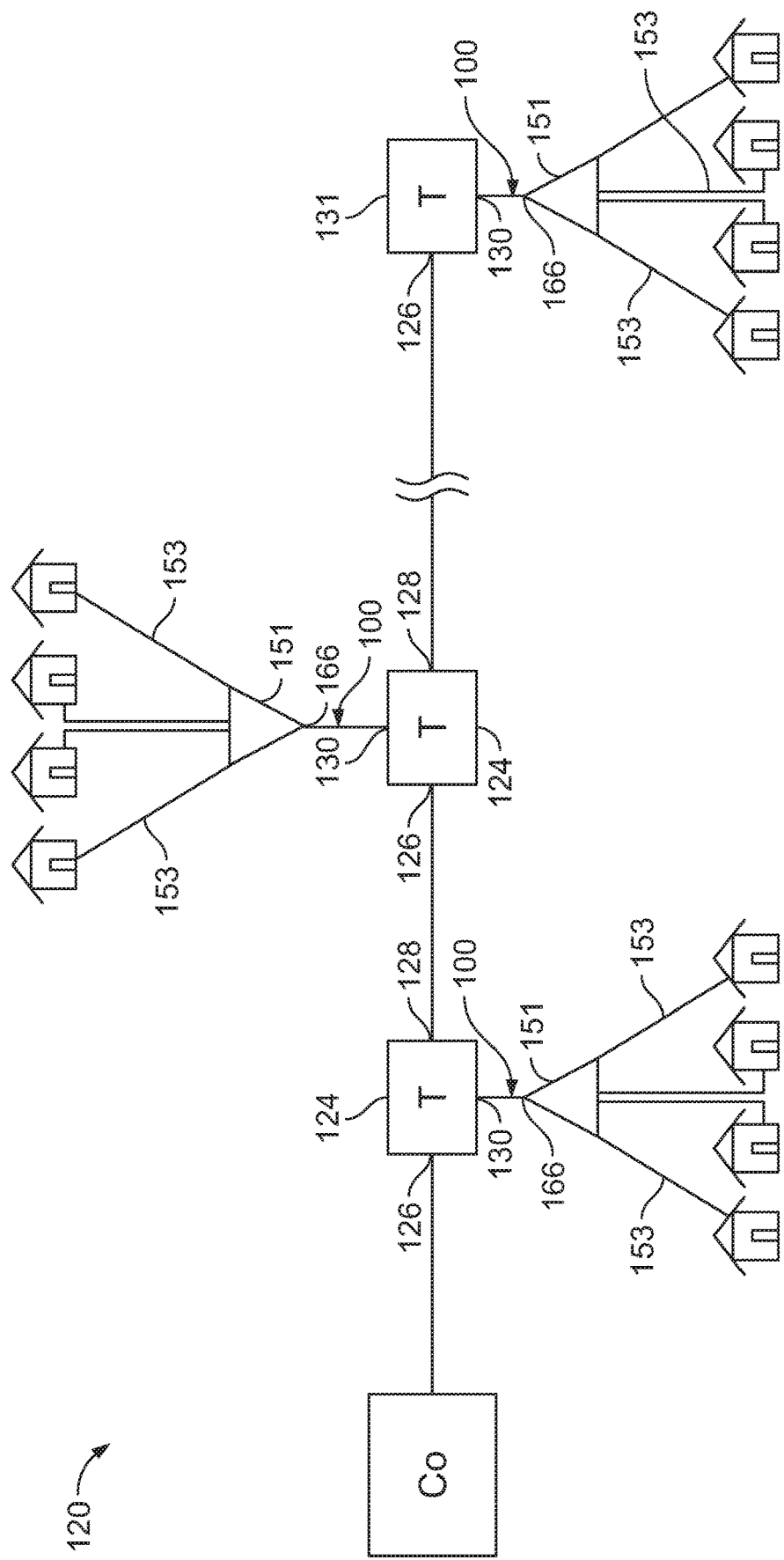
FIG. 2 is a schematic diagram illustrating another distributed tap architecture in accordance with the principles of the present disclosure.

FIG. 2 shows another distributed tap architecture 120 in accordance with the principles of the present disclosure. The distributed tap architecture 120 includes a plurality of tap terminals 124 each having a tap configuration that includes a fiber tap input 126, a fiber tap pass-through output 128 and a single fiber tap drop output 130. Terminal 131 is at the end of the chain of tap terminals and includes a fiber tap input 126 and a single drop location 130, but no fiber tap pass-through output. In certain examples, any or all of the tap inputs 126, tap drop outputs 130 and the tap pass-through outputs 128 can include: 1) a sealed cable port for receiving a cable having an input fiber; 2) a hardened de-mateable fiber optic connection location that is terminal mounted such as a ruggedized fiber optic adapter that is adapted for receiving a hardened fiber optic connector; or 3) a tether or stub cable having a free end terminated with a hardened fiber optic connector.

The tap drop outputs 130 can each be coupled to a distribution structure 150 that incorporates hardened connectivity. Example distribution structures 150 can include multi-service terminals/drop terminals having hardened adapter ports or structures having a plurality of fiber optic stub/tether cables terminated by hardened fiber optic connectors. In certain examples, environmentally sealed terminals, sheaths, coverings, fan-out structures or the like containing passive optical power splitters can be used.

Figure 15:
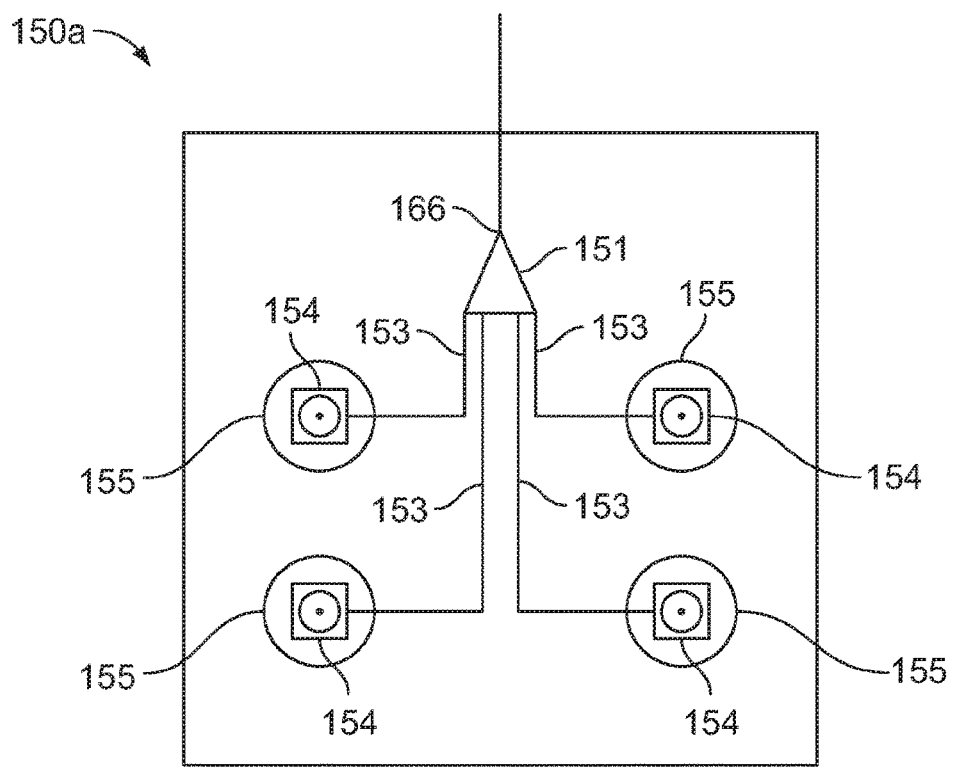
FIG. 15 is a schematic diagram of an example distribution structure including an optical splitter housed within an enclosure.

As shown at FIG. 15, an example distribution structure 150a can include an optical splitter 151 housed within an enclosure 152 (e.g., a sealed terminal housing). Fiber outputs 153 of the splitter can be terminated by fiber optic connectors 154 (e.g., a non-ruggedized fiber optic connectors) installed within the inner port/receptacles of hardened fiber optic adapters 155 mounted to a wall of the enclosure 152 or otherwise routed to a hardened de-mateable fiber optic connection location secured to the enclosure and accessible from an outside of the enclosure. The adapters 155 can include ports that can receive ruggedized fiber optic connectors from outside the enclosure to make optical connections with the splitter outputs.

Figure 16:
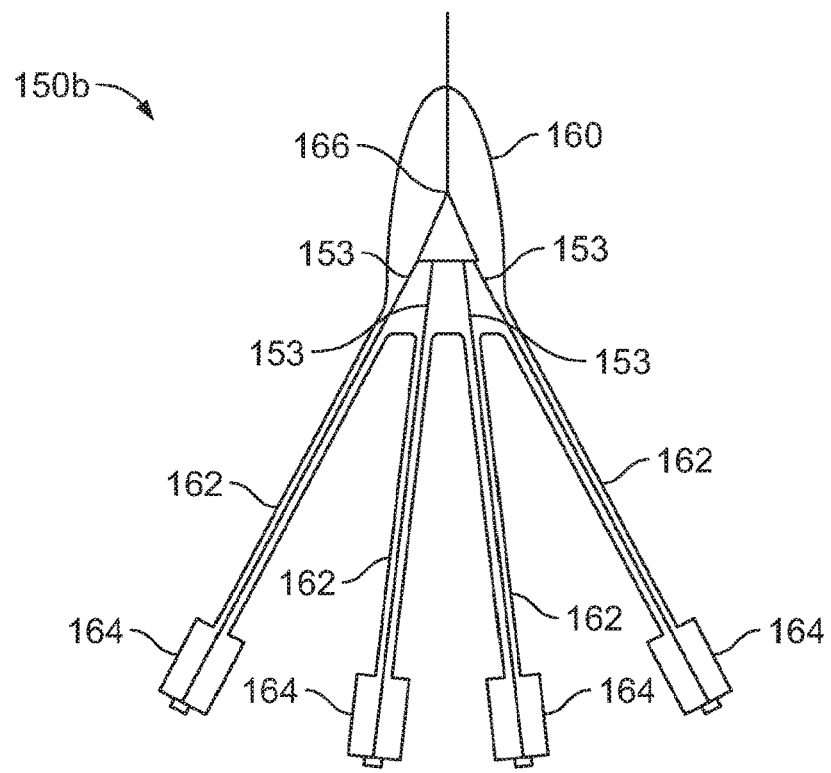
FIG. 16 is a schematic diagram of an example distribution structure including a protective covering enclosing the splitter.

As shown at FIG. 16, an example distribution structure 150b can include a protective covering 160 enclosing the splitter 151. Fiber outputs 153 of the optical power splitter can be coupled to fiber optic tether cables 162 having base ends secured at the protective covering and free ends terminated by hardened fiber optic connectors 164. Each tap drop (e.g., drop line 130 of FIG. 2) can be coupled to an input side 166 of the optical splitter 151. Fiber optic outputs of the passive splitter 151 are preferably coupled to hardened de-mateable connection locations (e.g., adapters 155 or connectors 164) which are remote from the tap terminals 124.

As described above, the hardened de-mateable connection locations can include enclosure mounted hardened fiber optic adapters, or cable mounted hardened fiber optic connectors. The hardened de-mateable fiber optic connection locations provide points for coupling subscribers to the network via drop cables. In certain examples, the tap terminals 124 may only include single tap drop outputs such that no additional splitting other than the syphoning off of a portion of the signal for the tap is provided within the tap terminals 124. In certain examples, terminals 124 can include outside accessible hardened, de-mateable fiber optic connection locations for coupling with the exterior splitting structures via cables (e.g., patch cables or input tether cables from the distribution structures). In other examples, the tap terminals 124 may include pressure actuated sealing gels defining cable ports for routing drop lines from the internal tap to the exterior splitting locations of the distribution structures 150. Example terminals suitable for housing optical splitters external from the tap terminals 124 are disclosed by U.S. Pat. No. 7,444,056 and RE 43,762, which are hereby incorporated by reference in their entireties. Example connectorized tethers are shown in WO 2014/197894 and WO 2014/167447, the disclosures of which are hereby incorporated herein by reference. Each tap terminal 104, 124 is implemented by optical tapping circuitry 400 having an input 401, a pass-through output 402, and one or more drop outputs 403. The optical tapping circuitry 400 passes a portion of the optical signal received at the input 401 onto the one or more drop outputs 403. FIG. 3 shows a tapping circuitry 400 with two drop lines 403. FIG. 4 shows a tapping circuitry 400 with four drop lines 403. A remainder of the optical signal is passed to the pass-through output 402.

In certain implementations, a tapping circuit 400 has a tap value of greater than 4 dB. In certain implementations, a tapping circuit 400 has a tap value of greater than or equal to 0 dB, 5 dB, 7 dB, 8 dB, 10 dB, 14 dB, 15 dB, 17 dB, 19 dB, or 21 dB. In certain implementations, in a daisy chain of tapping circuits 400, the tap values progressively decrease in dB at each tap terminal along the daisy-chain moving from a starting end of the daisy-chain to a terminated end of the daisy chain.

In some implementations, the tap circuit 400 is asymmetric. In some implementations, each of the drop outputs 403 of a single tap terminal 400 has the same signal value (e.g., signal power) that is less than the signal value of the pass-through output 402. In other implementations, the drop outputs 403 of a single tapping circuit 400 can have different signal values (e.g., signal powers). In certain implementations, the signal values (e.g., signal power) of each drop outputs 403 is less than the pass-through output 402. In certain examples, the combined signal value for all drop outputs 403 of the circuitry 400 is still less than the pass-through output 402. In other implementations, the drop lines 403 can have the same signal value as the pass-through output 402.

As used herein, the term "fiber optic connector" includes male fiber optic connectors, female fiber optic connectors and hermaphroditic fiber optic connectors. In some examples, male fiber optic connectors can have a form factor that includes a plug. In some examples, female fiber optic connectors can have a form factor that includes a port. In some examples, male fiber optic connectors can include connectors such as SC plugs or LC plugs. In some examples, female fiber optic connectors can include fiber optic adapters such as SC adapters or LC adapters. In some examples, the fiber optic connectors can be hardened. Examples of hardened female fiber optic connectors such as enclosure mounted hardened fiber optic adapters are disclosed by U.S. Pat. Nos. 7,207,727; 6,579,014; and 7,744,286, the disclosures of which are hereby incorporated by reference in their entireties. Examples of cable mounted hardened female fiber optic connectors are disclosed by U.S. Pat. No. 7,686,519 and U.S. patent application Ser. No. 14/782,934, the disclosures of which are hereby incorporated by reference in their entireties. Examples of hardened multi-fiber fiber optic connectors are disclosed by U.S. Pat. Nos. 9,304,262 and 7,137,742, and U.S. patent application Ser. No. 14/896,394, the disclosures of which are hereby incorporated by reference in their entireties. Examples of hardened male fiber optic connectors are disclosed by U.S. Pat. Nos. 7,744,386; 7,090,407; and 6,648,520; the disclosures of which are hereby incorporated by reference in their entireties. The above-identified fiber optic connection systems are ferruled fiber optic connections systems where the ends of optical fibers are secured in ferrules and ferrules assist in alignment of the optical fibers. Fiber optic connection systems in accordance with the principles of the present disclosure also include ferrule-less fiber optic connection systems where the optical fibers being aligned are not supported by ferrules. Examples of ferrule-less fiber optic connection systems are disclosed by PCT International Publication Nos. WO2016/043922 and WO2013/117598 and U.S. Patent Application Ser. No. 62/454,439, the disclosures of which are hereby incorporated by reference in their entireties. Fiber optic connectors are examples of de-mateable fiber optic connection interfaces.

A fiber optic connection system is hardened if it is more robust than convention indoor connection systems such as standard LC or SC indoor connection systems. An example indoor SC connection system is disclosed by U.S. Pat. No. 5,317,663, which is hereby incorporated by reference in its entirety. Hardened male and/or female fiber optic connectors in accordance with the principles of the present disclosure can be adapted for outdoor environmental use and can include environmental seals (e.g., elastomeric seals which may include ring-like seals such as o-ring seals) for preventing moisture/water intrusion. In certain examples, a hardened connection system can include a robust connector fastening arrangement. In certain examples, the robust connector fastening arrangement can include a twist-to-lock interface for holding two hardened fiber optic connectors together. Example twist-to-lock interfaces can include threaded interfaces and bayonet-style interfaces.

Figure 7:
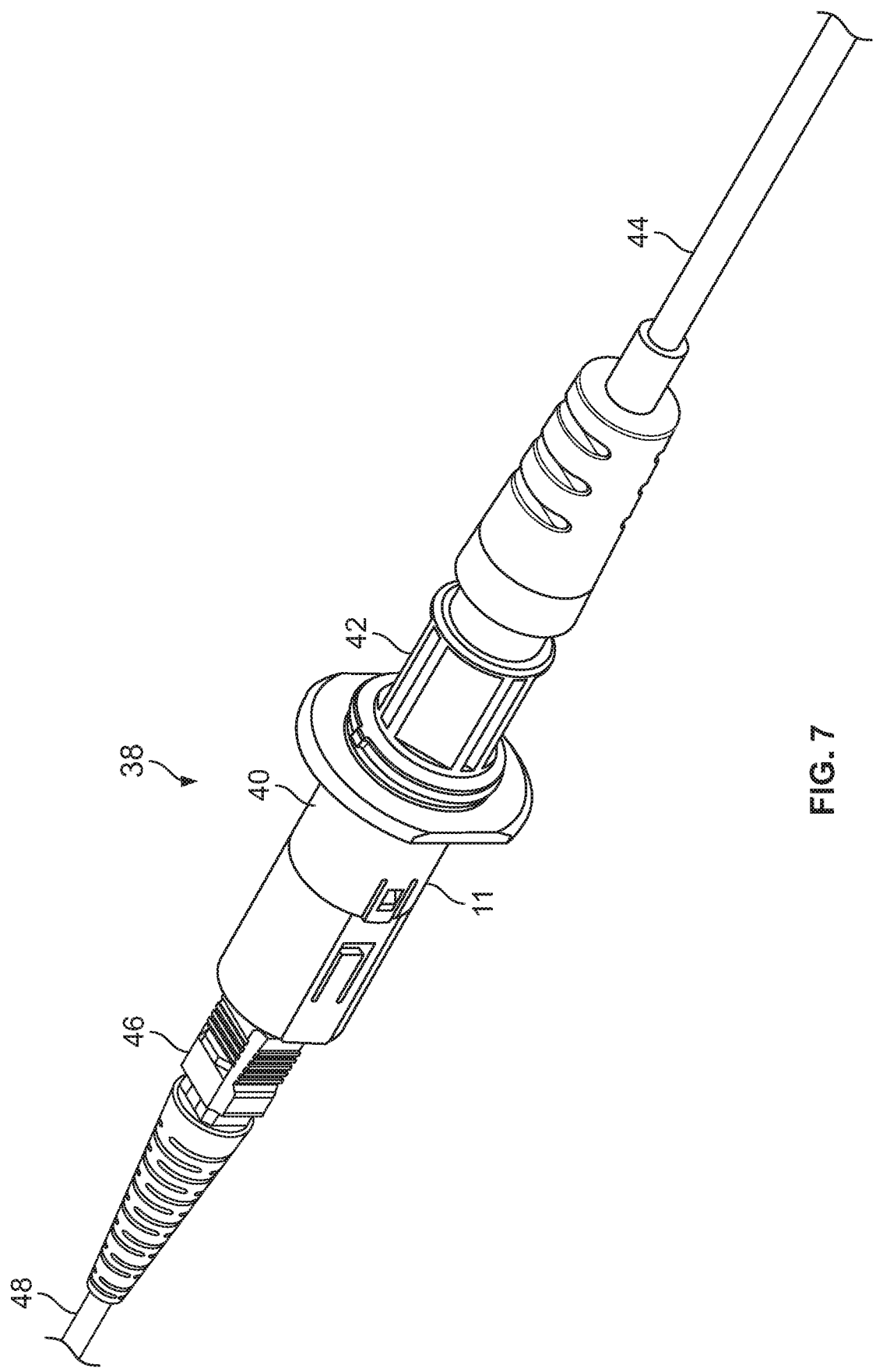
FIGS. 7 and 8 depict an example hardened fiber optic connection system.
Figure 8:
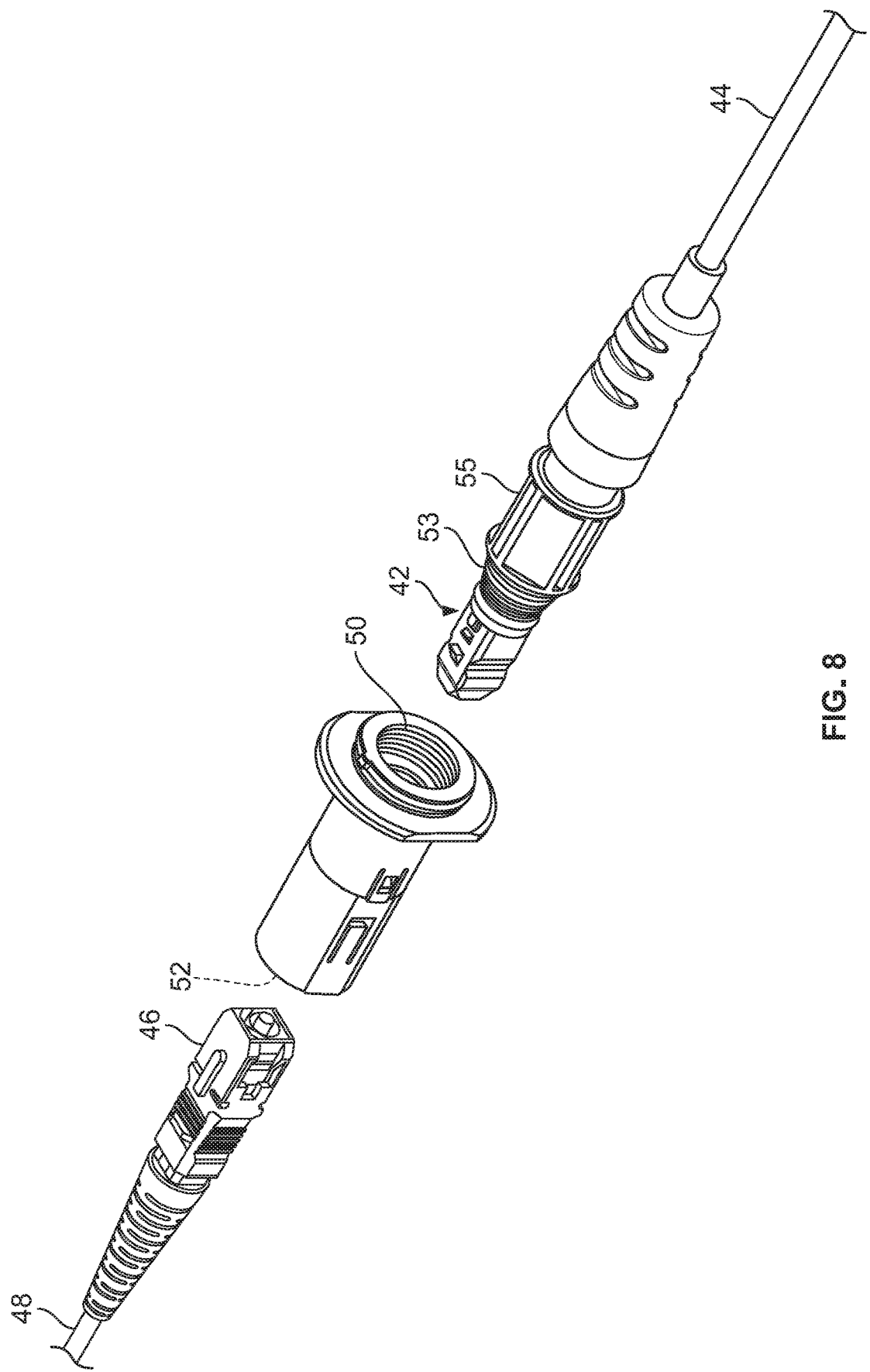

FIGS. 7 and 8 depict an example hardened fiber optic connection system 38. The fiber optic connection system 38 can include a hardened fiber optic adapter 40 (e.g., a female fiber optic connector or coupler), a first hardened fiber optic connector 42 (e.g., a male fiber optic connector) terminating a first fiber optic cable 44, and a second fiber optic connector 46 (e.g., a non-hardened male fiber optic connector) terminating a second fiber optic cable 48.

The fiber optic adapter 40 includes a hardened first port 50 for receiving the first fiber optic connector 42 and an unhardened second port 52 for receiving the second fiber optic connector 46. One example of an adapter is illustrated and described at U.S. patent application Ser. No. 11/657,402 entitled HARDENED FIBER OPTIC CONNECTOR, filed Jan. 24, 2007, that is hereby incorporated by reference in its entirety. The first fiber optic cable 44 is optically coupled to the second fiber optic cable 48 when the connectors 42, 46 are positioned within their respective ports 50, 52 of the fiber optic adapter 40. The second fiber optic connector 46 can be a conventional non-hardened fiber optic connector such as an SC connector. One example of an SC connector is illustrated and described at U.S. Pat. No. 5,317,663, which is hereby incorporated by reference in its entirety. The adapter 40 can include an internal ferrule alignment sleeve of co-axially aligning the ferrule of the connectors 42, 46. The ferrules can be made of a relatively hard material can are configured for supporting optical fibers corresponding to the fiber optic connectors. The ferrules can be cylindrical or other shapes such as rectangular (e.g., in the case of multi-fiber connectors). The adapter 40 is configured to be mounted to a terminal such that the port 50 is accessible from outside the terminal and the port 52 is accessible from inside the terminal.

FIGS. 9-14 illustrate examples 200, 300 of a tap terminal 104, 124 suitable for use with either of the tap architectures shown in FIGS. 1 and 2. The example tap terminals 200, 300 each include an enclosure 220, 310 that defines one or more inputs at which optical signals enter the enclosure 220, 310 and one or more outputs at which optical signals leave the enclosure 220, 310. In certain examples, an interior of the enclosure 220, 310 is environmentally sealed.

A factory-integrated optical tapping circuit (e.g., a tapping module) 400 is disposed within the interior of the enclosure 220, 310. Optical signals are routed from at least one of the inputs 106, 126 of the enclosure 220, 310 to an input 401 of the tapping circuit 400. As described above, the optical tapping circuit 400 separates a respective portion of the optical signal onto one or more drop lines 403. Each drop line 403 is routed to one of the outputs 110, 130 of the enclosure 220, 310. The optical tapping circuit 400 outputs a remainder of the optical signal onto a tap output line 402 that is routed to another of the outputs 108, 128 of the enclosure 220, 310. In certain examples, multiple optical tapping circuits 400 can be disposed within the interior of the enclosure 220, 310. Certain types of enclosures 220, 310 also can hold a splice arrangement, a splitter arrangement, and/or a wave divisional multiplexer arrangement in addition to the optical tapping circuit(s) 400 as will be discussed in more detail herein.

In certain implementations, the inputs and/or outputs 106, 126, 108, 128, 110, 130 of the enclosure 220, 310 can be color-coded or marked with other types of indicia. For example, an enclosure input 106, 126 (e.g., adapter port, connector, pass-through, etc.) can have a first color while a first enclosure output 108, 128 (e.g., adapter port, connector, pass-through, etc.) can have a second color and a third enclosure output 110, 130 (e.g., adapter port, connector, pass-through, etc.) can have a third color. In certain examples, one of the colors indicates the input 106, 126 is optically coupled to the input 401 of the optical tapping circuit 400, another of the colors indicates the output 108, 128 is optically coupled to the output 402 of the optical tapping circuit 400, and another of the colors indicates the output 110, 130 is optically coupled to a drop line 403 of the optical tapping circuit 400.

Figure 9:
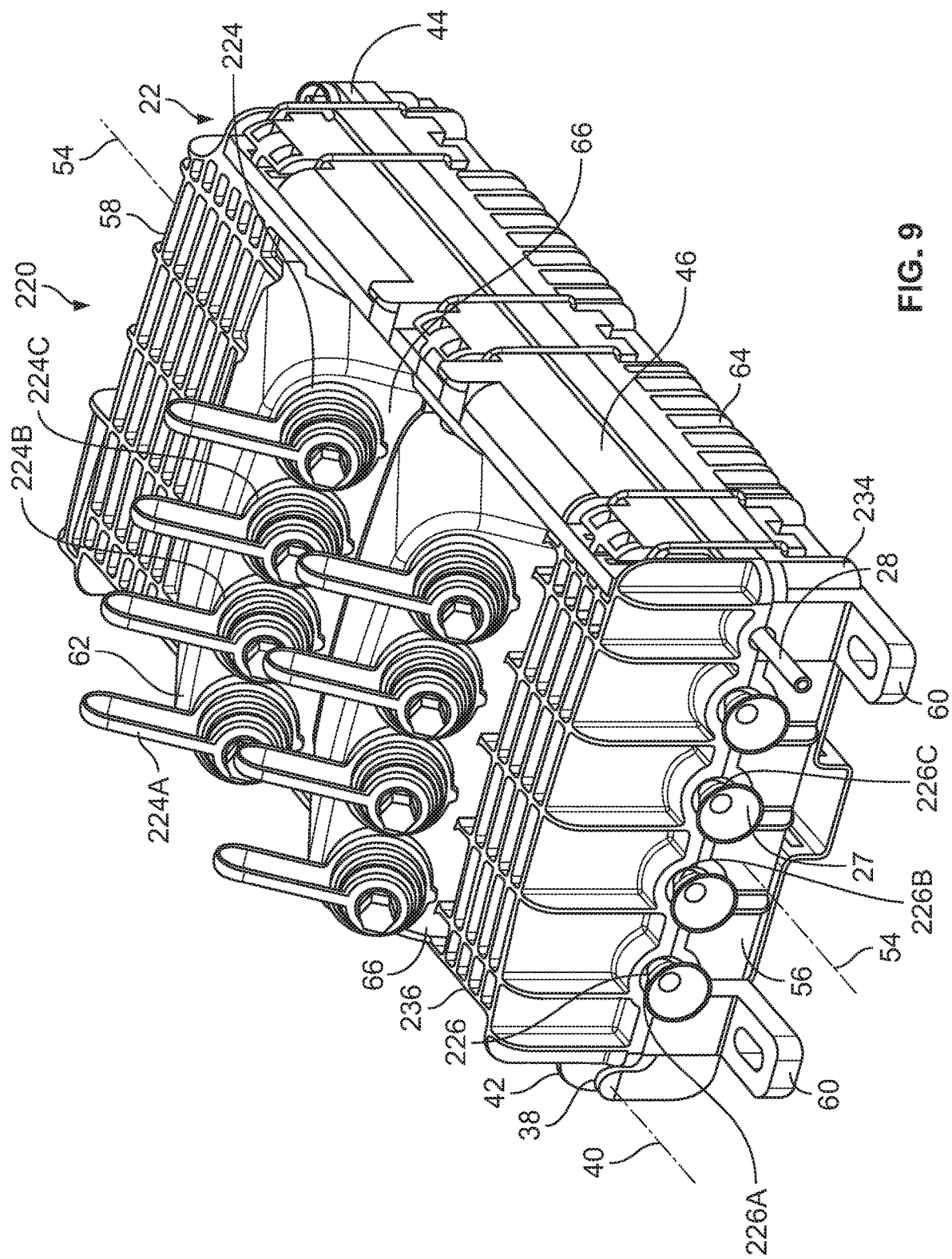
FIGS. 9-10 illustrate a first tap terminal suitable for use in either of the distributed tap architectures shown in FIGS. 1 and 2.
Figure 10:
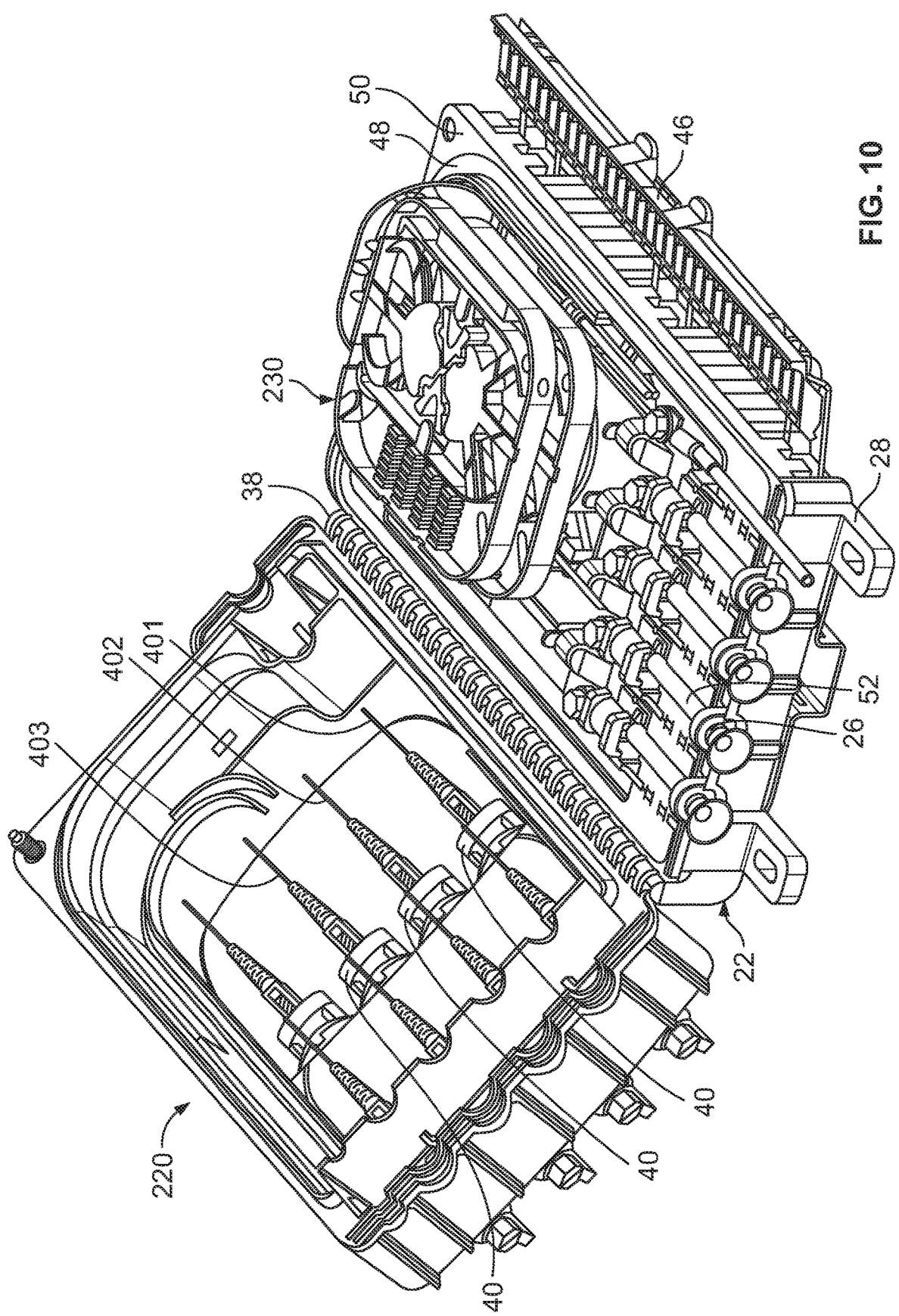
Figure 11:
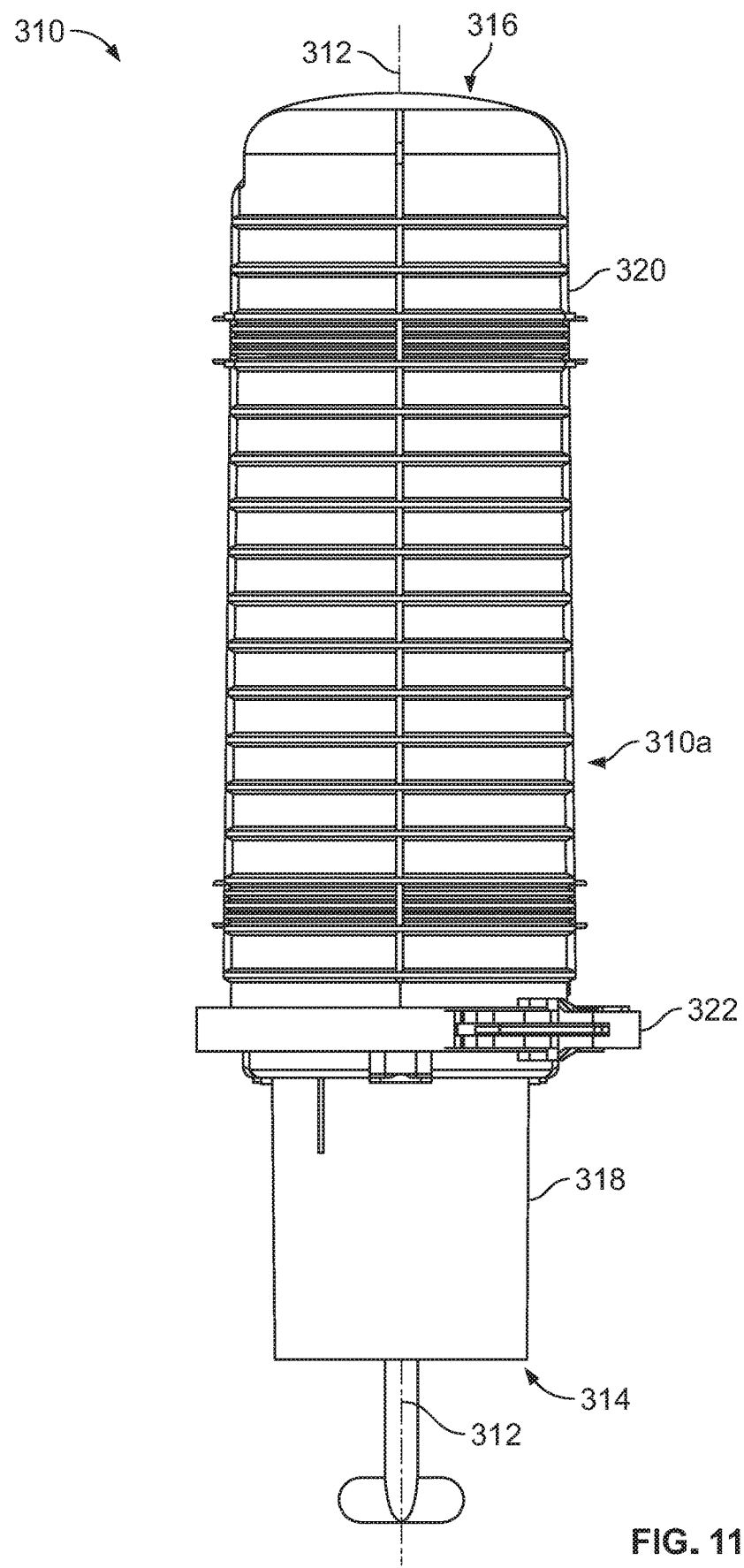
FIGS. 11-14 illustrate the second tap terminal suitable for use in either of the distributed tap architectures shown in FIGS. 1 and 2.
Figure 12:
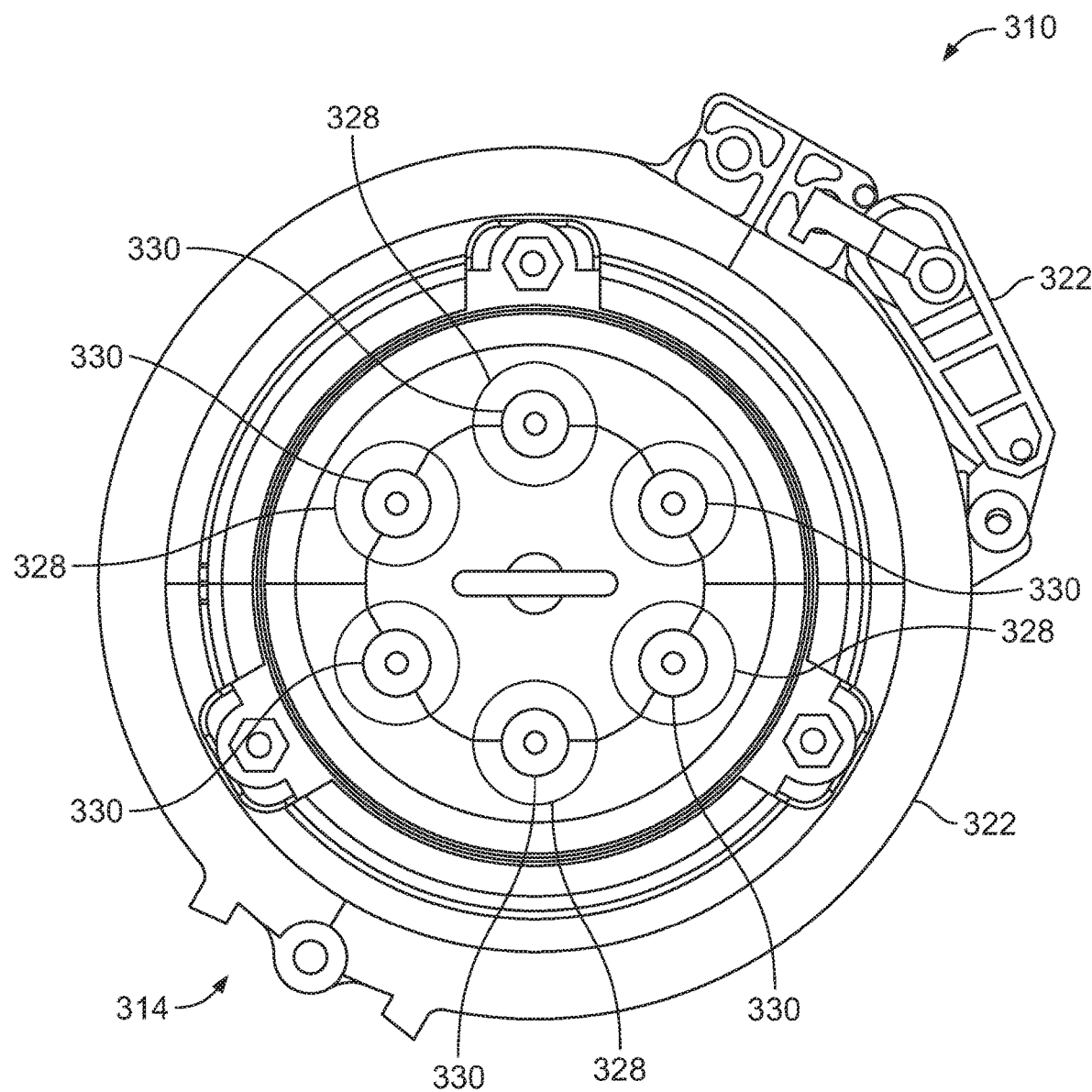

FIGS. 9 and 10 illustrate the first tap terminal 200. In certain implementations, the first tap terminal 200 accelerates fiber deployment for new subscriber activation and service, minimizing labor costs. The first tap terminal 200 can be installed in pedestal, hand hole, pole or strand mount applications for fast and easy integration into the network for residential and commercial services. Strand mount brackets and polemount bracket accessory kits are available. Certain example tap terminals 200 are sometimes referred to as Optical Termination Enclosures (OTEs).

In certain implementations, the first tap terminal 200 includes a re-enterable enclosure 220. For example, the enclosure 220 can includes a base 234 that cooperates with a cover 236 to define the interior of the enclosure 220. In certain examples, the cover 236 moves (e.g., pivots) relative to the base 234 between an open position in which the interior of the enclosure 220 is accessible from an exterior of the enclosure 220 and a closed position in which the interior of the enclosure 220 is environmentally sealed. In an example, the enclosure 220 is a gasketed, hardened plastic enclosure that is seal-rated for underground applications (e.g., meets requirements of Telcordia GR-771).

In certain implementations, the enclosure 220 includes one or more de-mateable connection locations 224 that serve as the input(s) and/or the output(s). In some implementations, one or more of the de-mateable connection locations 224 is implemented as an optical adapter 220 having one or more internal ports accessible from the interior of the enclosure 220 and one or more external ports accessible from an exterior of the enclosure 220. In other implementations, one or more of the de-mateable connection locations 224 is implemented as a connector (e.g., a male connector, a female connector) terminating a distal end of stub/tether cable extending outwardly from the enclosure 220.

In certain implementations, the de-mateable connection locations 224 are ruggedized as disclosed above with respect to FIGS. 7-8. For example, the de-mateable connection locations 224 can include hardened optical adapters 40 (see FIG. 8) or hardened optical connectors 42 (see FIG. 8). In some implementations, one or more of the de-mateable connection locations 224 are single-fiber connection locations 224. In other implementations, one or more of the de-mateable connection locations 224 are multi-fiber connection locations 224. In certain implementations, the de-mateable connection locations include pre-connectorized hardened full-size or mini-size (DLX®) adapter ports. In other implementations, the de-mateable connection locations include LC adapter ports, SC adapter ports, MPO adapter ports, or any other desired connection interface.

In certain implementations, the enclosure 220 includes one or more cable pass-through locations 226 that serve as the input(s) and/or the output(s). In certain examples, the cable pass-through locations 226 are sealed (e.g., using a gel-fill, a rubber-gasket, foam, etc.) so that the interior of the enclosure 220 can be environmentally sealed even as a cable extends through the cable-pass-through location 226 from an exterior of the enclosure 220 to an interior of the enclosure 220.

In the example shown in FIGS. 9 and 10, the enclosure 220 includes eight de-mateable connection locations 224 and four cable pass-through locations 226. In other examples, the enclosure 220 can include a greater or lesser number (e.g., three, four, six, ten, twelve, etc.) of de-mateable connection locations 224. Other example enclosures 220 also can have a greater or lesser number (e.g., two, six, etc.) of cable pass-through locations 226.

In some examples, the input 401 of the optical tapping circuit 400 is optically coupled to a first de-mateable connection location 224A, the output 402 of the optical tapping circuit 400 is optically coupled to a second de-mateable connection location 224B, and a drop line 403 of the optical tapping circuit 400 is optically coupled to a third de-mateable connection location 224C. For example, the input 401 of the optical tapping circuit 400 can include an internal fiber having a terminated end (e.g., a non-ruggedized terminated end) that plugs into the internal port of an optical adapter 40 at the first de-mateable connection location 224A; the pass-through output 402 of the optical tapping circuit 400 can include an internal fiber having a terminated end (e.g., a non-ruggedized terminated end) that plugs into the internal port of an optical adapter 40 at the second de-mateable connection location 224B; and the drop output 403 of the optical tapping circuit 400 can include an internal fiber having a terminated end (e.g., a non-ruggedized terminated end) that plugs into the internal port of an optical adapter 40 at the third de-mateable connection location 224C. Additional drop lines 403 from the optical tapping circuit 400 can be routed to additional de-mateable connection locations 224. In other implementations, two or more drop lines can be routed to the same multi-fiber de-mateable connection location (e.g., to a multi-fiber hardened optical adapter, to a multi-fiber hardened optical connector, etc.).

In other examples, the input of the optical tapping circuit is optically coupled to a cable extending through a first cable pass-through location 226A and the output of the optical tapping circuit is optically coupled to a cable extending through a second cable pass-through location 226B. A drop line for the optical tapping circuit extends through or is optically coupled to a cable extending through a third cable pass-through location 226C. Additional drop lines from the optical tapping circuit can be routed to additional cable pass-through locations 226.

In other examples, the input and output of the optical tap circuit are optically coupled to cables extending through cable pass-through locations 226 and the drop lines are routed to de-mateable connection locations 224. In other examples, the input and output of the optical tap circuit are optically coupled to de-mateable connection locations 224 and the drop lines extend through or are optically coupled to cables extending through cable pass-through locations 226. In still other examples, one of the input and the output of the optical tapping circuit is routed to a de-mateable connection location and the other of the input and the output is routed to a cable pass-through location 226.

In an example, the enclosure 220 includes a factory-integrated tap module with the Tap Input and Thru (Output) and Drop Outputs connected to the adapter ports 40 on the cover 236 of the enclosure 220. In certain implementations, the enclosure 220 has yellow plugs factory-installed in the drop ports and a ground plug, thereby eliminating the need to open the enclosure 220 during installation. In an example, the Tap input port is color coded green, the Tap Thru port is color coded orange. The enclosure 220 can have various port layouts for Tap input ports, Tap Thru ports, and Tap drop line ports.

In various examples, the enclosure 220 can be manufactured and shipped from the factory with 4-port, 8-port, 12-port integrated taps. In other examples, the enclosure 220 can be manufactured and shipped from the factory with integrated tap modules having a greater or lesser number of ports. In still other examples, the enclosure 220 can be manufactured and shipped from the factory without any tap modules.

In certain implementations, one or more optical cables can pass-through the enclosure 220 without having any fibers being broken out from the cable or otherwise optically coupled to other equipment (e.g., tap modules, splices, splitters, etc.) within the enclosure 220. For example, a cable can have a first section extending through a first cable pass-through port 226 and a second section extending through a second cable pass-through port 226. If the second cable pass-through port 226 is located at the same end wall of the enclosure 220 as the first cable pass-through port 226, then the enclosure 220 has a butt-end configuration. If the second cable pass-through port 226 is located at an opposite end wall of the enclosure 220 from the first cable pass-through port 226, then the enclosure 220 has an inline configuration.

In certain implementations, the enclosure 220 includes a splice arrangement (e.g. one or more splice trays) disposed within the interior. In some examples, a cable entering the enclosure 220 through a first of the cable pass-through ports 226A can be spliced to a second cable entering the enclosure 220 through a second of the cable pass-through ports 226B. In other examples, a cable entering the enclosure 220 through a first of the cable pass-through ports 226A can be spliced to an internal fiber routed to one of the de-mateable connection locations 224 (e.g., to an adapter, along a stub cable to a connector, etc.). In other examples, one of the de-mateable connection locations 224 can be optically spliced to another of the de-mateable connection locations 224 using internal fibers (e.g., plugged into internal ports of an adapter implementing the de-mateable connection location or terminated by a connector implementing the de-mateable connection location).

In certain implementations, the enclosure 220 includes a splitter arrangement (e.g. an optical power splitter, a wave division multiplexer, etc.) 230 disposed within the interior. In some examples, a cable entering the enclosure 220 through a first of the cable pass-throughs 226A can be split (e.g., power split, wavelength split, etc.) to two or more cables entering the enclosure 220 through other cable pass-throughs 226. In other examples, a cable entering the enclosure 220 through a first of the cable pass-throughs 226A can be split to two or more internal fibers routed to one of the de-mateable connection locations 224 (e.g., to an adapter, along a stub cable to a connector, etc.). In other examples, one of the de-mateable connection locations 224 can be optically split to two or more other de-mateable connection locations 224 using internal fibers (e.g., plugged into internal ports of adapters implementing the de-mateable connection locations or terminated by a connectors implementing the de-mateable connection locations). In still other examples, a cable entering the enclosure 220 through a de-mateable connection location can be split to two or more cables exiting the enclosure 220 through the cable pass-throughs 226.

An example of a suitable enclosure 220 is disclosed in WO 2206/226340, the disclosure of which is hereby incorporated herein by reference.

FIGS. 11-14 illustrate the second tap terminal 300. The example tap terminal 300 includes an enclosure 310 that defines one or more inputs at which optical signals enter the enclosure 310 and one or more outputs at which optical signals leave the enclosure 310. In certain examples, an interior of the enclosure 310 is environmentally sealed. In certain examples, the enclosure 310 is re-enterable. The enclosure 310 is sometimes referred to as a Fiber Optic Splice Closure (FOSC). In certain examples, tap functionality expands FOSC capabilities, providing cabling flexibility and facilitating simpler installations.

An optical tapping circuit is disposed within the interior of the enclosure 310. Optical signals are routed from at least one of the inputs of the enclosure 310 to an input 401 of the optical tapping circuit 400. As described above, the optical tapping circuit 400 separates a respective portion of the optical signal onto one or more drop lines 403. Each drop line 403 is optically coupled to a cable extending through one of the outputs of the enclosure 310. The optical tapping circuit 400 outputs a remainder of the optical signal onto a tap output line 402 that is optically coupled to a cable extending through another of the outputs of the enclosure 310. Certain types of enclosures 310 also can hold a splice arrangement, a splitter arrangement, and/or a wave divisional multiplexer arrangement in addition to the tap circuit as will be discussed in more detail herein.

The tap terminal 300 may include an environmentally sealed enclosure 310, a mounting bracket, and a tap module. Optical fibers/cables are routed into the enclosure 310 through cable ports 328, which will be described in more detail herein. One of the optical fibers/cables (e.g., a distribution cable of FIG. 1 or 2) is optically coupled to the input 401 of the tapping circuit 400. For example, the incoming fiber/cable can be in-line spliced (e.g., fusion spliced, mechanically spliced, etc.) to the input 401 of the tapping circuit 400. Another of the optical fibers/cables is optically coupled (e.g., optically spliced, connected at a termination bank, etc.) to the pass-through output 402 of the tapping circuit 400. Another of the optical fibers/cables is optically coupled (e.g., optically spliced, connected at a termination bank, etc.) to the drop output 403 of the tapping circuit 400. For example, the drop output 403 of the tapping circuit 400 may be connectorized and routed to a termination bank within the enclosure 310. A connectorized end of a pigtail fiber can be optically coupled to the connectorized drop output 403 at the termination bank. The optical fiber/cable can be optically spliced to a non-connectorized end of the pigtail to optically couple to the drop output 403 of the tapping circuit 400. Additional drop outputs 403 of the tapping circuit 400 also can be optically coupled (e.g., spliced, connectorized, etc.) to additional fibers/cables entering the enclosure 310 through cable ports 328.

In certain implementations, the tap circuit 400 is implemented using a tap module. Each tap module includes one or more trays. In certain examples, each tap module includes at least two trays. A first of the trays is a single-depth tray which houses the optical module and provides splice sleeve capacity for the distribution fiber and the drop fibers. A second of the trays is the double-depth tray which contains the adaptors for the drop connections.

In various examples, the tap module can include a 2-port (i.e., two drop line) tap module, a 4-port (i.e., four drop line) tap module, or an 8-port (i.e., eight drop line) tap module. In other examples, the tap modules can have other port configurations (e.g., 1-port, 3-port, 6-port, 10-port, 12-port, etc.). The enclosure 310 accommodates a wide variety of fiber cables; including armored, all dielectric, and flat-drop style cables.

The enclosure 310 defines a central longitudinal axis 312 that extends along a length of the enclosure 310 from a bottom end 314 to a top end 316. A base 318 defines the bottom end 314 of the enclosure 310 while a dome 320 defines the top end 316 of the enclosure 310 that together form a housing 310a. The base 318 and the dome 320 are interconnected by a clamp 322. For example, a channel-style clamp 322 can mounts over flanges defined by the base 318 and the dome 320. A seal (not shown) can mount between the base 318 and dome 320 to provide an environmental seal that prevents moisture, dust and, pests from entering the interior of the enclosure 310. Other enclosure configurations (e.g., enclosures with mating half-shells, enclosures with pivoting access doors, enclosures with main bodies and side covers, butt-style enclosures, pass-through enclosures, etc.) also are contemplated and are within the scope of the present disclosure.

A plurality of cable through-ports 328 (e.g., cable ports) extend through and are defined by a sealant arrangement 354 that mounts within the base 318. The ports 328 allow cables (e.g., trunk cables, drop cables, or other cables) to enter the enclosure 310 in a sealed manner. The plurality of cable through-ports 328 can be temporarily blocked by plugs 330 to seal any unoccupied cable through-ports 328 (see FIG. 12). When it is desired to install a cable (e.g., a drop cable or a pass-through cable) through one of the cable through-ports 328, the plug 330 corresponding to the given cable through-port 328 is removed so that the cable can be inserted through the cable through-port 328.

Figure 13:
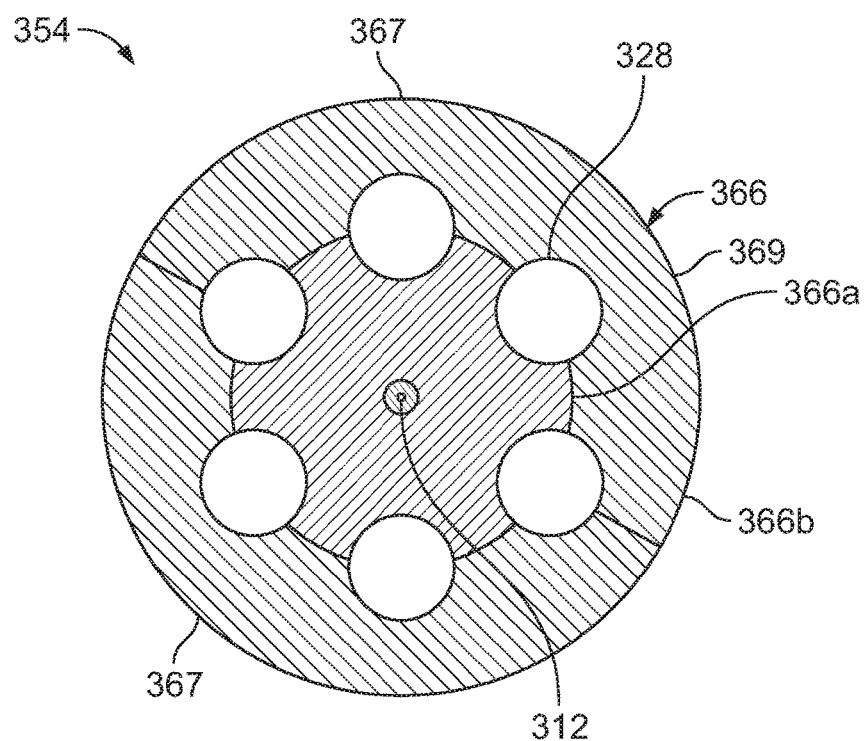

As best shown at FIG. 13, the sealant arrangement 354 includes a volume of sealant 366 (e.g., a gel block) that defines the ports 328 and also forms a perimeter seal with an interior the base 318. The volume of sealant includes an inner portion 366a and an outer portion 366b. The outer portion 366b is positioned outward in a radial orientation (i.e., radial relative to the axis 312 when the sealing unit is mounted in the base 318) relative to the inner portion 366a. The ports 328 are defined between the inner and outer portions 366a, 366b (e.g., half-ports are defined by the inner portion 366a and corresponding half-ports are defined by the outer portion 366b). The outer portions 366b cooperate to form the perimeter seal with respect to the interior of the base 318 (e.g., the outer portions 366b include an outer surface 369 adapted to engage and seal against an inner surface of the base 318 when the sealant arrangement is mounted in the base). The outer portion 366b includes a plurality of segments 367 that can be removed from the inner portion 366a when the volume of sealant 366 has been removed from the base 318. By removing the segments of the outer portion 366b from the inner portion 366a, cables or other structures (e.g., fiber optic connection modules) can be laterally inserted within the ports 328. After the structures have been inserted in the half-ports of the inner portion 366a, the segments of the outer portion 366b can be assembled about the inner portion 366a such that the structures are captured within the ports 328 between the inner and outer portions 366a, 366b. Thus, the sealant arrangement 354 can have a wrap-around configuration such that structures such as cables or modules need not be axially inserted through the ports 328. Other sealant arrangements are also contemplated. For example, another suitable sealant arrangement is disclosed by PCT International Publication No. WO 2224/0059216, which is hereby incorporated by reference in its entirety.

The sealant arrangement 354 can be part of a sealing unit 355 that mounts within the base 318. The sealing unit can include an actuation arrangement 367 for pressurizing the volume of sealant 366 within the base 318 causing the sealant to flow/deform within the base to fill any voids such that peripheral/perimeter sealing is provided with the base 318 and sealing is also provided about any cables or other structures routed through any of the ports 328. In one example, axial pressurization (e.g., pressurization along the axis 312 when the sealing unit is mounted in the base 318) of the volume of sealant 366 forces the volume of sealant 366 to deform radially outwardly to provide a circumferential seal against an interior surface of the base 18. Concurrently, pressurization of the volume of sealant 366 causes the cable through-ports 328 to constrict in diameter. In this way, the volume of sealant 366 presses against and conforms to the outer shape of whatever structure is mounted through the primary cable through-ports 328 (e.g., a primary cable, a drop cable, a pass-through cable, a distribution cable, a plug 330, or a connector module). That is, the volume of sealant 366 forms circumferential seals around the structures received within the cable through-ports 328.

Figure 14:
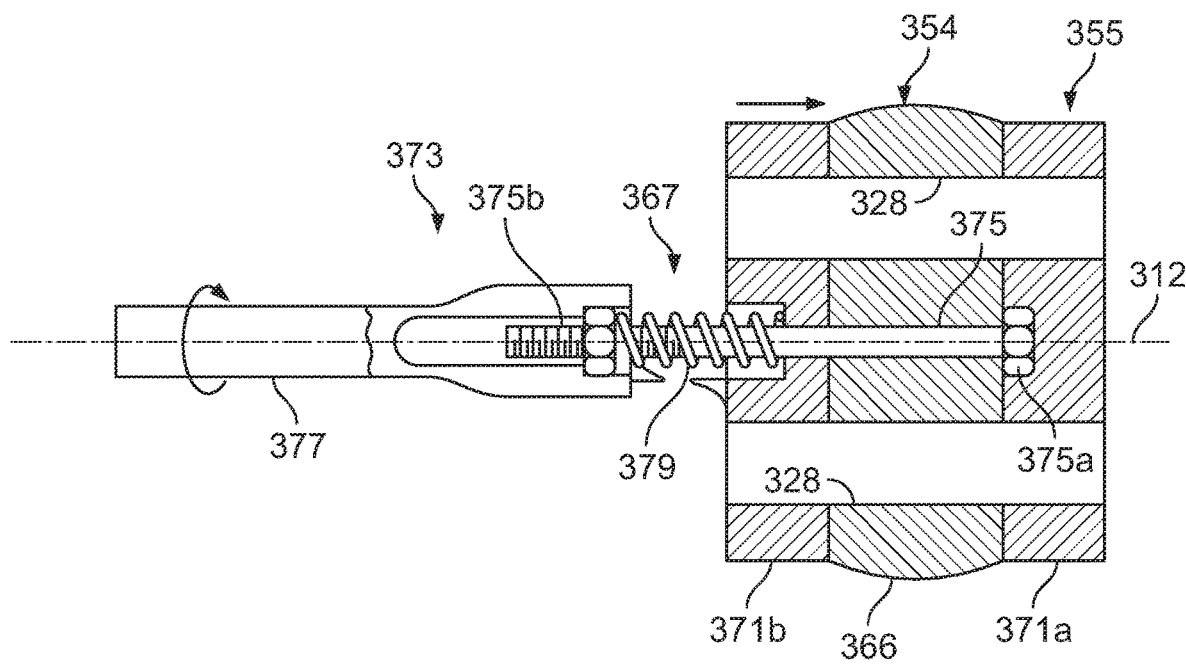

As shown at FIG. 14, the actuation arrangement 367 can include inner and outer sealant containment structures 371a, 371b (i.e., pressurization structures) such as plates, walls, retainers or like structures between which the volume of sealant is axially positioned and contained. The outer sealant containment structure 371b is positioned outward in an axial orientation (i.e., along axis 312 when the sealing unit is mounted in the base 318) relative to the inner sealant containment structure 371a. The containment structures 371a, 371b can define openings that coincide with the locations of the ports 328 and can include interconnected inner portions and outer portions that correspond to the inner and outer portions 366a, 366b of the volume of sealant 366. The inner and outer portions of the containment structures 371a, 371b can interlock and can also be separated from each other such that the containment structures 371a, 371b do not interfere with the ability to insert structures laterally into the ports 328 (i.e., the containment structures can be configured to complement the wrap-around functionality of the sealant assembly).

The actuation arrangement 367 can also include an actuator that can be actuated to force the sealant containment structures 371a, 371b axially together to cause the volume of sealant to be pressurized between the sealant containment structures 371a, 371b. The actuator can cause an axial spacing between the sealant containment structures 371a, 371b to reduce in size when the actuator is actuated. In some examples, the actuator can include a threaded configuration that is actuated through a threading action (e.g., threading an actuator handle). In other examples, the actuator can include a cam configuration that is actuated through a cam action and may include an actuator handle in the form of a pivoting lever arm. In certain examples, the actuation arrangement 367 can include one, two, three or more springs for applying a spring load or loads (e.g., spring pressure) that biases the sealant containment structures 371a, 371b axially together when the actuator is actuated to cause the volume of sealant to be pressurized under spring pressure. In some examples, a shaft or shafts placed under spring tension can be used to transfer spring pressure between the sealant containment structures 371a, 371b.

Referring again to FIG. 14, the actuation arrangement 367 is shown including an example actuator 373 including a tensioning shaft 375, a rotatable handle 377 threaded on the shaft 375 and a spring 379 positioned over the shaft 375 and captured axially between the handle 377 and an outer side of the outer sealant containment structure 371b. The shaft 375 includes an inner end 375a that is attached to the inner containment structure 371a and an attachment location. In one example, the attachment location includes a mechanical interface that prevents relative axial movement between the shaft 375 and the inner containment structure 371a and also prevents the shaft 375 from rotating about its axis relative to the inner containment structure 371a. An outer end 375b of the shaft 375 is threaded and threadingly engages the handle 377. The actuation arrangement 367 is actuated by threading the handle 377 on the shaft 375 such that the spring 379 is compressed against the outer surface of the outer sealant containment structure 371b causing the shaft 375 to be tensioned such that the inner and outer sealant containment structure 371a, 371b are drawn together to pressurize the sealant between the containment structures 371a, 371b. The spring pressure provided by the compressed spring 379 maintains the volume of sealant 366 under pressure within the base 318.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. An enclosure comprising:
a sealed housing having a front including a stepped configuration including adapter mounting surfaces angled to be facing forwardly and downwardly;
one or more hardened fiber optic adapters mounted at the adapter mounting surfaces, the one or more hardened fiber optic adapters having outer ports accessible from an outside of the sealed housing;
an optical tap positioned within the sealed housing, the optical tap having a tap input, a tap pass-through output and a tap drop output, wherein the tap input comprises a first signal level, the tap pass-through output comprises a second signal level, and the tap drop output comprises a third signal level, the third signal level of the tap drop output being less than the second signal level of the tap pass-through output;
a passive optical power splitter or a wavelength division multiplexer positioned within the sealed housing, wherein an input of the passive optical power splitter or the wavelength division multiplexer is optically coupled to the tap drop output;
wherein the one or more hardened fiber optic adapters include a first hardened fiber optic adapter optically coupled to the tap input, the first hardened fiber optic adapter including a first dust cap that is color coded with a first color corresponding to the first signal level;
wherein the one or more hardened fiber optic adapters including a second hardened fiber optic adapter optically coupled to the tap pass-through output, the second hardened fiber optic adapter including a second dust cap that is color coded with a second color corresponding to the second signal level and different than the first color; and
wherein the one or more hardened fiber optic adapters including at least a third hardened fiber optic adapter optically coupled to the passive optical power splitter or the wavelength division multiplexer, the third hardened fiber optic adapter including a third dust cap that is color coded with a third color corresponding to the third signal level and different than the first color and the second color.

2. The enclosure of claim 1, wherein the optical tap includes a single tap drop output.

3. The enclosure of claim 1, wherein the optical tap includes 2, 3, 4, 5, 6, 7, 8 or more tap drop outputs.

4. The enclosure of claim 1, wherein the first color is green and the second color is orange.

5. The enclosure of claim 1, further comprising additional hardened de-mateable fiber optic connection locations carried with the enclosure that are not optically connected to the optical tap.

6. The enclosure of claim 1, wherein the enclosure is enterable.

7. The enclosure of claim 1, wherein the enclosure includes brackets, tabs or other structures for permitting pole mounting, strand mounting or hand-hole mounting.

8. The enclosure of claim 1, wherein the enclosure defines one or more gel-sealed cable ports for allowing drop cables and/or pass-through cables to be routed into the enclosure.

9. The enclosure of claim 1, further comprising one or more splice trays positioned within an interior of the enclosure.

10. The enclosure of claim 1, wherein the stepped configuration includes at least two adapter mounting surfaces, wherein the first hardened fiber optic adapter and the second hardened fiber optic adapter are co-located on one of the at least two adapter mounting surfaces.

11. The enclosure of claim 1, wherein the stepped configuration includes at least two adapter mounting surfaces, wherein the first hardened fiber optic adapter, the second hardened fiber optic adapter, and the third hardened fiber optic adapter are co-located on one of the at least two adapter mounting surfaces.

12. The enclosure of claim 1, wherein the first color corresponding to the tap input is green and the second color corresponding to the tap pass-through output is orange.

13. The enclosure of claim 2, wherein an output of the passive optical power splitter or the wavelength division multiplexer is optically coupled to the third hardened fiber optic adapter and at least a fourth hardened fiber optic adapter.

14. The enclosure of claim 13, wherein the output of the passive optical power splitter or the wavelength division multiplexer is optically coupled to at least one of two hardened fiber optic adapters, four hardened fiber optic adapters, or eight hardened fiber optic adapters.

15. An enclosure comprising:
a sealed housing having a front including a stepped configuration with adapter mounting surfaces angled to be facing forwardly and downwardly;
one or more hardened fiber optic adapters mounted at the adapter mounting surfaces, the one or more hardened fiber optic adapters having outer ports accessible from an outside of the sealed housing;
an optical tap positioned within the sealed housing, the optical tap having a tap input, a tap pass-through output, and a tap drop output, wherein the tap input comprises a first signal level, the tap pass-through output comprises a second signal level, and the tap drop output comprises a third signal level, the third signal level of the tap drop output being less than the second signal level of the tap pass-through output;
a first hardened fiber optic adapter optically coupled to the tap input including a first dust cap that is color coded with a first color corresponding to the tap input;
a second hardened fiber optic adapter optically coupled to the tap pass-through output including a second dust cap that is color coded with a second color corresponding to the tap pass-through output and different from the first color; and
a passive optical power splitter or a wavelength division multiplexer positioned within the sealed housing, wherein an input of the passive optical power splitter or the wavelength division multiplexer is optically coupled to the tap drop output, and an output of the passive optical power splitter or the wavelength division multiplexer is optically coupled to at least a third hardened fiber optic adapter and a fourth hardened fiber optic adapter, wherein the third hardened fiber optic adapter and the fourth hardened fiber optic adapter each include a dust cap that is color coded with a third color corresponding to the tap drop output and different from the first color and the second color.

16. The enclosure of claim 15, wherein the stepped configuration includes at least two adapter mounting surfaces, wherein the first hardened fiber optic adapter and the second hardened fiber optic adapter are co-located on a first adapter mounting surface of the at least two adapter mounting surfaces.

17. The enclosure of claim 16, wherein at least the third hardened fiber optic adapter and the fourth hardened fiber optic adapter are co-located on a second adapter mounting surface of the at least two adapter mounting surfaces.

18. The enclosure of claim 15, wherein the first color corresponding to the tap input is green and the second color corresponding to the tap pass-through output is orange.

\* \* \* \* \*